United States Patent
Yoon et al.

(10) Patent No.: US 9,490,070 B2
(45) Date of Patent: Nov. 8, 2016

(54) MULTILAYER CERAMIC ELECTRONIC COMPONENT, MANUFACTURING METHOD THEREOF AND BOARD HAVING THE SAME MOUNTED THEREON

(71) Applicant: SAMSUNG ELECTRO-MECHANICS CO., LTD., Suwon-Si, Gyeonggi-Do (KR)

(72) Inventors: Sun Ho Yoon, Suwon-Si (KR); Hang Kyu Cho, Suwon-Si (KR); Han Soung Jeong, Suwon-Si (KR); Hyo Jung Kim, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 122 days.

(21) Appl. No.: 14/258,876

(22) Filed: Apr. 22, 2014

(65) Prior Publication Data

US 2015/0221437 A1    Aug. 6, 2015

(30) Foreign Application Priority Data

Feb. 6, 2014    (KR) .................. 10-2014-0013769

(51) Int. Cl.
```
H01G 4/12      (2006.01)
H01K 1/18      (2006.01)
H01G 4/30      (2006.01)
H01G 4/008     (2006.01)
```
(52) U.S. Cl.
CPC .............. *H01G 4/1209* (2013.01); *H01G 4/30* (2013.01); *H01G 4/0085* (2013.01); *H01G 4/1227* (2013.01)

(58) Field of Classification Search
CPC ...... H01G 4/1209; H01G 4/30; H05K 1/181; H05K 2201/10015
USPC .......... 361/321.1, 301.4; 174/258; 156/89.12
See application file for complete search history.

(56) References Cited

U.S. PATENT DOCUMENTS

| 5,183,631 A * | 2/1993 | Kugimiya ................ B22F 1/02 419/10 |
| 8,158,255 B2 * | 4/2012 | Yokoyama ........... C01G 29/006 156/89.11 |
| 2008/0068777 A1 * | 3/2008 | Takeoka .............. C04B 35/4682 361/321.4 |
| 2008/0242532 A1 | 10/2008 | Nishikawa |
| 2012/0033343 A1 | 2/2012 | Yoon et al. |

FOREIGN PATENT DOCUMENTS

| JP | 2000-223352 A | 8/2000 |
| KR | 10-2008-0087662 A | 10/2008 |
| KR | 10-2012-0023509 A | 3/2012 |

* cited by examiner

*Primary Examiner* — Timothy Thompson
*Assistant Examiner* — Charles Pizzuto
(74) *Attorney, Agent, or Firm* — McDermott Will & Emery LLP

(57) ABSTRACT

A multilayer ceramic electronic component may include: a ceramic body in which dielectric layers containing plate-shaped dielectric grains are stacked; and internal electrodes disposed on the dielectric layers within the ceramic body. The dielectric layer may contain dielectric grains, plate-shaped surfaces of which have an angle of 20° or less with regard to a boundary surface between the dielectric layer and the internal electrode.

8 Claims, 9 Drawing Sheets

A-A'

MULTILAYER CERAMIC ELECTRONIC COMPONENT, MANUFACTURING METHOD THEREOF AND BOARD HAVING THE SAME MOUNTED THEREON

CROSS-REFERENCE TO RELATED APPLICATION

This application claims the benefit of Korean Patent Application No. 10-2014-0013769 filed on Feb. 6, 2014, with the Korean Intellectual Property Office, the disclosure of which is incorporated herein by reference.

BACKGROUND

The present disclosure relates to a multilayer ceramic electronic component, a manufacturing method thereof, and a board having the same mounted thereon.

Among the ceramic electronic components, a multilayer ceramic capacitor includes a plurality of multilayer dielectric layers, internal electrodes disposed to face each other, having at least one of the dielectric layers interposed therebetween, and external electrodes electrically connected to the internal electrodes.

The multilayer ceramic capacitor has been widely used in mobile communications devices such as computers, personal digital assistants (PDAs), cellular phones, and the like, due to advantages such as a small size, high capacitance, easiness of mounting, and the like.

Recently, as electronic products have been miniaturized and multi-functionalized, chip components also tend to be miniaturized and multi-functionalized, and therefore, the multilayer ceramic capacitor has also been required to have a small size and high capacitance.

To this end, a multilayer ceramic capacitor has been manufactured to have a structure in which an increased number of layers are stacked by making dielectric layers and internal electrode layers thin, and the dielectric layers are required to have high permittivity.

RELATED ART DOCUMENT (Patent Document 1) Korean Patent Laid-Open Publication No. 10-2012-0023509

SUMMARY

An aspect of the present disclosure may provide a multilayer ceramic electronic component, a manufacturing method thereof, and a board having the same mounted thereon.

According to an aspect of the present disclosure, a multilayer ceramic electronic component may include: a ceramic body in which dielectric layers containing plate-shaped dielectric grains are stacked; and internal electrodes disposed on the dielectric layers within the ceramic body, wherein the dielectric layer may contain dielectric grains, plate-shaped surfaces of which have an angle of 20° or less with regard to a boundary surface between the dielectric layer and the internal electrode.

When a diameter of the plate-shaped surface of the dielectric grain is a and a thickness of the dielectric grain is c, $a/c \geq 1.5$ may be satisfied.

When an area of the plate-shaped surface of the dielectric grain is s and a thickness of the dielectric grain is c, $s/c \geq 2.25$ may be satisfied.

The dielectric layer may contain a dielectric base material and bismuth.

The dielectric layer may contain a dielectric base material, and the dielectric base material may contain a barium titanate-based dielectric material.

The dielectric layer may contain a dielectric base material and bismuth, and the bismuth may be contained in an amount of 0.2 to 1.6 moles based on 100 moles of the dielectric base material.

The dielectric layer may contain a dielectric base material and bismuth, and the bismuth may be contained as bismuth-oxide ($Bi_2O_3$) in an amount of 0.1 to 0.8 mole based on 100 moles of the dielectric base material.

The dielectric grains, plate-shaped surfaces of which have an angle of 20° or less with regard to the boundary surface between the dielectric layer and the internal electrode, may make up 60% or more of the dielectric grains contained in the dielectric layer.

According to another aspect of the present disclosure, a method of manufacturing a multilayer ceramic electronic component may include: preparing a ceramic slurry containing a dielectric base material and bismuth (Bi); forming ceramic green sheets using the ceramic slurry; forming internal electrode patterns on the ceramic green sheets using a conductive paste for internal electrodes; forming a multilayer body by stacking the ceramic green sheets having the internal electrode patterns formed thereon; and forming a ceramic body by sintering the multilayer body, the ceramic body including dielectric layers containing plate-shaped dielectric grains and internal electrodes.

The method may further include performing a rolling process in which stress is applied to the ceramic green sheets after the forming of the ceramic green sheets.

The ceramic green sheets may be formed by performing an injection casting process using the ceramic slurry.

The ceramic slurry may contain 0.2 to 1.6 moles of the bismuth based on 100 moles of the dielectric base material.

The ceramic slurry may contain 0.1 to 0.8 mole of bismuthoxide ($Bi_2O_3$) based on 100 moles of the dielectric base material, in consideration of converting the bismuth into bismuthoxide ($Bi_2O_3$).

The dielectric base material may contain a barium titanate-based dielectric material.

The dielectric layer may contain dielectric grains, plate-shaped surfaces of which, have an angle of 20° or less with regard to a boundary surface between the dielectric layer and the internal electrode.

When a diameter of a plate-shaped surface of the dielectric grain is a and a thickness of the dielectric grain is c, $a/c \geq 1.5$ may be satisfied.

When an area of a plate-shaped surface of the dielectric grain is s and a thickness of the dielectric grain is c, $s/c \geq 2.25$ may be satisfied.

The dielectric layer may contain dielectric grains, plate-shaped surfaces of which have an angle of 20° or less with regard to a boundary surface between the dielectric layer and the internal electrode, in an amount of 60% or more.

According to another aspect of the present disclosure, a board having a multilayer ceramic capacitor mounted thereon, the board may include: a printed circuit board having first and second electrode pads disposed thereon; and a multilayer ceramic electronic component mounted on the printed circuit board, wherein the multilayer ceramic electronic component includes: a ceramic body in which dielectric layers containing plate-shaped dielectric grains are stacked; and internal electrodes disposed on the dielectric layers within the ceramic body, the dielectric layer containing dielectric grains, plate-shaped surfaces of which have an angle of 20° or less with regard to a boundary surface between the dielectric layer and the internal electrode.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
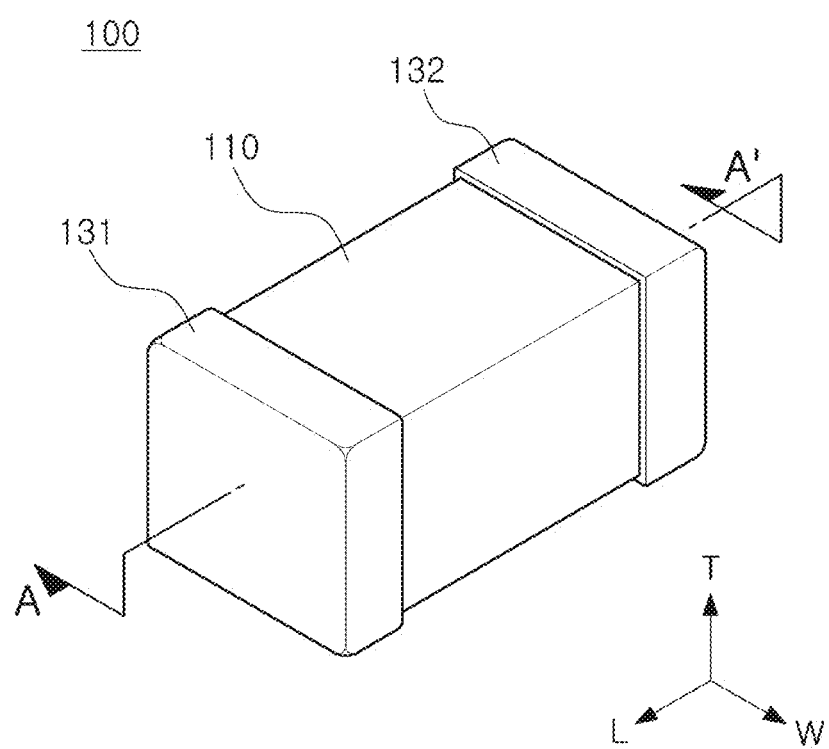
FIG. 1 is a perspective view illustrating a multilayer ceramic electronic component according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
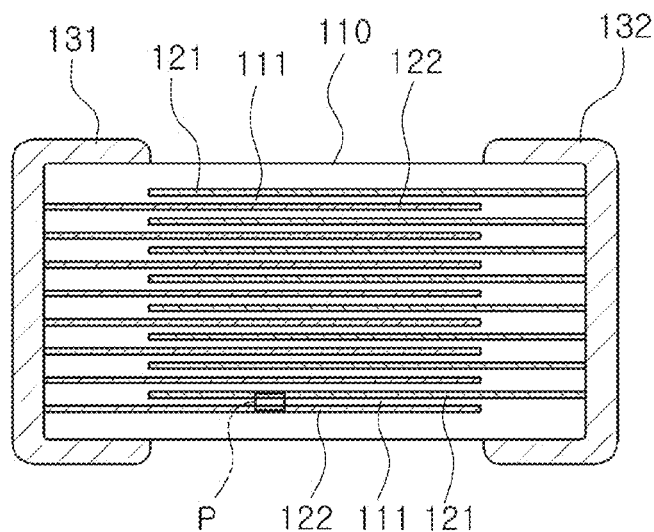
FIG. 2 is a cross-sectional view taken along line A-A' of FIG. 1.

FIG. 1 is a perspective view showing a multilayer ceramic electronic component according to an exemplary embodiment of the present disclosure, and FIG. 2 is a cross-sectional view taken along line A-A' of FIG. 1.

Referring to FIG. 1, a multilayer ceramic electronic component 100 according to an exemplary embodiment of the present disclosure may be a multilayer ceramic capacitor, and may include a ceramic body 110, and external electrodes 131 and 132.

Referring to FIG. 2, the ceramic body 110 may include an active layer contributing to forming capacitance and upper and lower cover layers formed on and below the active layer as upper and lower margin parts. The active layer may include dielectric layers 111 and internal electrodes 121 and 122, wherein the plurality of first and second internal electrodes 121 and 122 may be alternately stacked having the dielectric layer 111 interposed therebetween.

The external electrodes 131 and 132 may be formed on an outer surface of the ceramic body 110 to be connected to the internal electrodes 121 and 122, and may include the first external electrode 131 and the second external electrode 132.

In an exemplary embodiment of the present disclosure, a shape of the ceramic body 110 is not particularly limited, but may be substantially hexahedral. The ceramic body 110 may not have a perfectly hexahedral shape, but may have a shape substantially similar to a hexahedron, due to sintering shrinkage of a ceramic powder at the time of a sintering process of a chip, a thickness difference according to presence or absence of internal electrode patterns, and a polishing process of corner or edge portions of the ceramic body.

Directions of a hexahedron will be defined in order to clearly describe exemplary embodiments of the present disclosure. L, W and T shown in the accompanying drawings refer to a length direction, a width direction, and a thickness direction, respectively. Here, a thickness direction may be the same as a direction in which dielectric layers are stacked.

The internal electrodes may include the first and second internal electrodes 121 and 122, and the first and second internal electrodes 121 and 122 may be disposed to face each other, having the dielectric layer 111 interposed therebetween. The first and second internal electrodes 121 and 122, a pair of electrodes having different polarities, may be formed by printing a conductive paste containing a conductive metal on the dielectric layers 111 at a predetermined thickness. The pair of first and second internal electrodes 121 and 122 may be alternately exposed to both end surfaces of the ceramic body 110, and may be electrically insulated from each other by the dielectric layer 111 disposed therebetween.

The first and second internal electrodes 121 and 122 may be electrically connected to the external electrodes 131 and 132 through portions thereof alternately exposed to both end surfaces of the ceramic body 110. The external electrodes may include the first external electrode 131 and the second external electrode 132, wherein the first internal electrodes 121 may be electrically connected to the first external electrode 131 and the second internal electrodes 122 may be electrically connected to the second external electrode 132.

Therefore, in the case in which voltage is applied to the first and second external electrodes 131 and 132, electric charges are accumulated between the first and second internal electrodes 121 and 122 facing each other. Here, capacitance of the multilayer ceramic capacitor 100 is in proportion to an area of a region in which the first and second internal electrodes 121 and 122 are overlapped with each other.

Further, the conductive metal contained in the first and second internal electrodes 121 and 122 may be nickel (Ni), copper (Cu), palladium (Pd), or an alloy thereof, but is not limited thereto.

The upper and lower cover layers may be formed by stacking a single dielectric layer or two or more dielectric layers on upper and lower surfaces of the active layer in a vertical direction, respectively, and may serve to prevent the first and second internal electrodes 121 and 122 from being damaged by physical or chemical stress.

Figure 3:
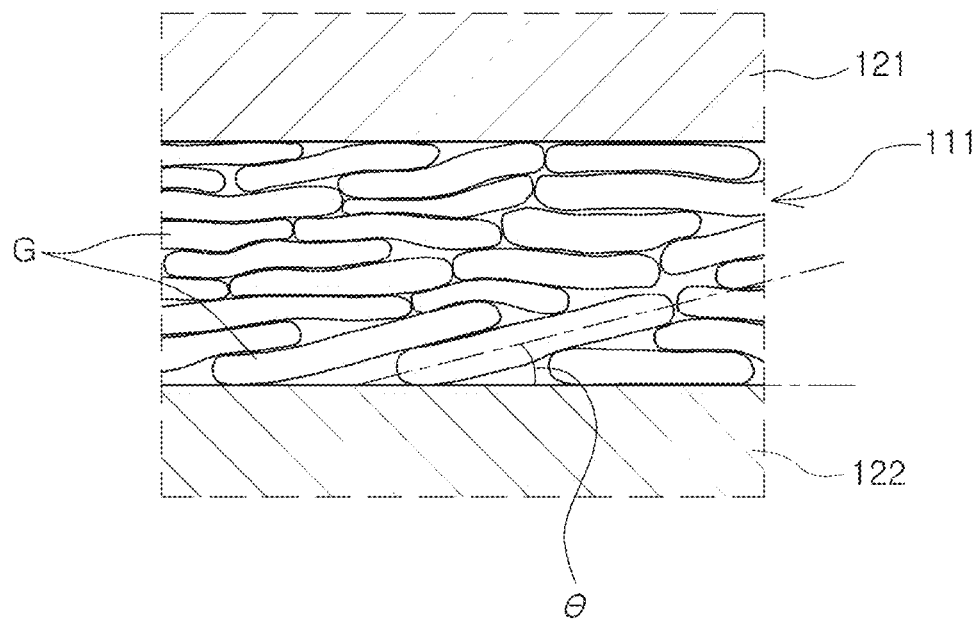
FIG. 3 is an enlarged view of part P of FIG. 2.

FIG. 3 is an enlarged view of part P of FIG. 2.

As shown in FIG. 3, the dielectric layer 111 may contain dielectric grains, and the dielectric grains may have a plate shape. Since the dielectric grains have a plate shape, the dielectric layers may become thin, and thus, a multilayer ceramic electronic component having high capacitance and high reliability may be obtained.

Dielectric grains contained in an existing dielectric layer have a substantially spherical shape. However, in the case in which the dielectric layer contains the plate-shaped dielectric grains as described in the exemplary embodiment of the present disclosure, the number of dielectric grains per unit thickness of the dielectric layer may be increased. Accordingly, when voltage is applied thereto, the occurrence of a leakage current may be reduced, whereby reliability may be improved. In addition, the dielectric layer has a highly oriented microstructure, thereby achieving high permittivity and improved high temperature withstand voltage properties.

When an interface between the dielectric layer and the internal electrode is defined as a boundary surface between the dielectric layer and the internal electrode, an angle θ formed by the boundary surface between the dielectric layer and the internal electrode and a plate-shaped surface of the dielectric grain may be 45° or less, and preferably, 20° or less.

When the angle θ of the plate-shaped surface of the dielectric grain with regard to the boundary surface between the dielectric layer and the internal electrode is 20° or less, withstand voltage of the dielectric layer may be improved, and permittivity of the dielectric layer may be significantly improved as compared with an existing dielectric layer having the same thickness.

Figure 4:
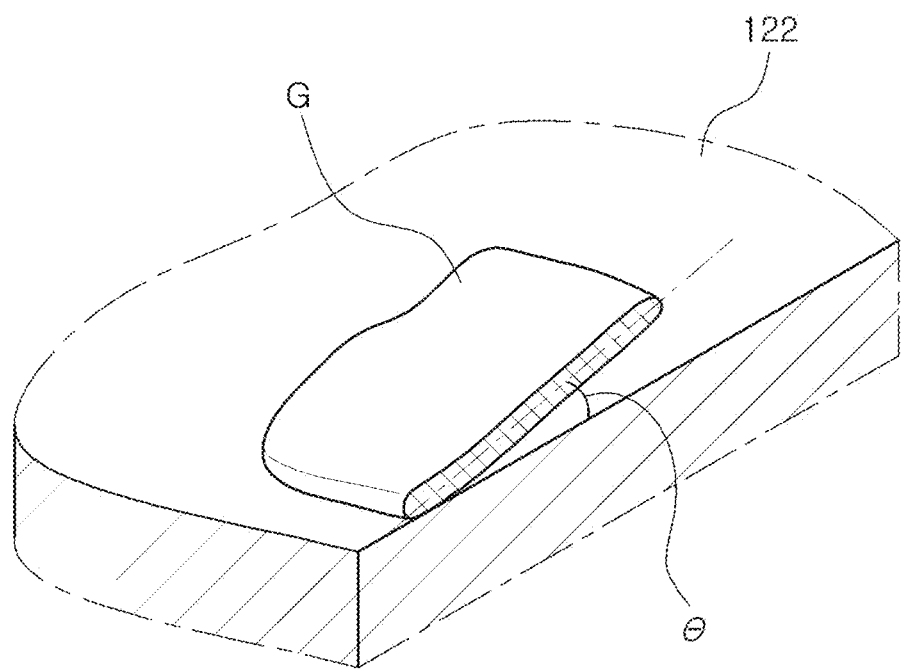
FIG. 4 is a view illustrating a relationship between dielectric grains and a boundary surface between a dielectric layer and an internal electrode.

FIG. 4 is a view illustrating a relationship between the dielectric grains and the boundary surface between the dielectric layer and the internal electrode. In particular, FIG. 4 illustrates one surfaces of a single dielectric grain G contained in the dielectric layer and an internal electrode adjacent thereto (denoted by 122 in FIG. 4), in a cross-section of the multilayer ceramic electronic component taken in a length-thickness direction or a width-thickness direction.

The angle θ formed by the boundary surface between the dielectric layer and the internal electrode and the plate-shaped surface of the dielectric grain may be measured in a manner illustrated in FIGS. 3 and 4. Referring to FIGS. 3 and 4, the angle θ of the plate-shaped surface of the dielectric grain with regard to the boundary surface between the dielectric layer and the internal electrode may be obtained by measuring an angle θ formed by one surface of the internal electrode and an imaginary straight line in parallel to the plate-shaped surface of the dielectric grain, in the cross-section of the multilayer ceramic electronic component in the length-thickness direction or the width-thickness direction.

According to an exemplary embodiment of the present disclosure, when a diameter of the plate-shaped surface of the dielectric grain is a and a thickness of the dielectric grain is c, $a/c \geq 1.5$ may be satisfied. In the case in which the plate-shaped surface of the dielectric grain does not have a circular shape, a diameter of the plate-shaped surface may be defined as the longest straight line among straight lines connecting two points disposed at edges of the plate-shaped surface.

In the case in which $a/c$ is less than 1.5, insulation resistance and permittivity of the dielectric layer may not be significantly improved as compared to a dielectric layer using spherical-shaped dielectric grains.

In addition, according to an exemplary embodiment of the present disclosure, when an area of the plate-shaped surface of the dielectric grain is s and the thickness of the dielectric grain is c, $s/c \geq 2.25$ may be satisfied. In the case in which $s/c$ is 2.25 or more, and the above-mentioned effect of the plate-shaped dielectric grains may be improved. In the case in which $s/c$ is less than 2.25, reliability, permittivity, and high temperature withstand voltage properties of the dielectric layer may be insignificant as compared with a dielectric layer including spherical or amorphous dielectric grains.

According to an exemplary embodiment of the present disclosure, dielectric grains whose plate-shaped surfaces have an angle θ of 20° or less with regard to the boundary surface between the dielectric layer and the internal electrode may make up 60% or more of the dielectric grains contained in the dielectric layer. In the case in which the dielectric grains whose plate-shaped surfaces have an angle of 20° or less with regard to the boundary surface between the dielectric layer and the internal electrode may be contained in the dielectric layer in an amount less than 60%, electrical properties may deteriorate as compared to the case in which those dielectric grains are contained in an amount of 60% or more.

In other words, in the case in which the dielectric layer contains the dielectric grains whose plate-shaped surfaces have an angle θ of 20° or less with regard to the boundary surface between the dielectric layer and the internal electrode in an amount of 60% to 100%, the dielectric layer may have excellent electrical properties, and in the case in which the dielectric layer contains the dielectric grains whose plate-shaped surfaces have an angle θ of 20° or less with regard to the boundary surface between the dielectric layer and the internal electrode in an amount less than 60%, electrical properties such as permittivity and high temperature withstand voltage properties may relatively deteriorate.

Therefore, the dielectric layer may contain the dielectric grains whose plate-shaped surfaces have an angle θ of 20° or less with regard to the boundary surface between the dielectric layer and the internal electrode in an amount of 60% or more.

According to an exemplary embodiment of the present disclosure, in order to form the plate-shaped dielectric grains, the dielectric layer may contain a dielectric base material having high permittivity and bismuth (Bi), and in order to improve orientation of the dielectric grains contained in the dielectric layer, a pressing process in which stress is applied to the ceramic green sheets may be performed before sintering the dielectric layers. The pressing process will be described in detail in a process of manufacturing a multilayer ceramic electronic component to be described below.

The dielectric base material may be a barium titanate ($BaTiO_3$)-based dielectric material, but is not limited thereto.

The barium titanate-based dielectric material may include at least one of ferroelectric materials having a perovskite structure, for example, $BaTiO_3$, $(Ba_{1-x}Ca_x)(Ti_{1-y}Ca_y)O_3$, $(Ba_{1-x}Ca_x)(Ti_{1-y}Zr_y)O_3$, $(Ba_{1-x}Ca_x)TiO_3$, and the like.

According to an exemplary embodiment of the present disclosure, the dielectric layer 111 may contain 0.2 to 1.6 moles of the bismuth based on 100 moles of the dielectric base material. In the case in which the dielectric layer contains bismuthoxide ($Bi_2O_3$) as the bismuth, the dielectric layer may contain 0.1 to 0.8 mole of the bismuthoxide based on 100 moles of the dielectric base material, in consideration of converting the bismuth into bismuthoxide ($Bi_2O_3$).

The plate-shaped dielectric grains having excellent orientation may be obtained by adding the bismuth and using the pressing process, and thus, dielectric layers having high permittivity and a multilayer ceramic capacitor having high reliability may be obtained. In particular, the bismuth contributing to the most excellent feature in view of formation and orientation of the plate-shaped dielectric grains may be contained in an amount of 0.2 to 1.6 moles based on 100 moles of the dielectric base material.

In the case in which the bismuth contained in the dielectric layer 111 is less than 0.2 mole based on 100 moles of the dielectric base material, the dielectric grains may not have a uniform plate shape, resulting in low orientation thereof.

In addition, in the case in which the bismuth contained in the dielectric layer 111 exceeds 1.6 moles based on 100 moles of the dielectric base material, the dielectric grains may have an extremely large size. In this case, permittivity of the dielectric layer may be increased, but reliability may deteriorate.

Therefore, the bismuth may be contained in an amount of 0.2 to 1.6 moles based on 100 moles of the dielectric base material.

Method of Manufacturing Multilayer Ceramic Electronic Component

Hereinafter, a method of manufacturing a multilayer ceramic electronic component according to an exemplary embodiment of the present disclosure will be described, but the present disclosure is not limited thereto.

In descriptions of the method of manufacturing the multilayer ceramic electronic component according to the present exemplary embodiment, a description of features the same as those of the above-mentioned multilayer ceramic electronic component will be omitted.

Figure 5:
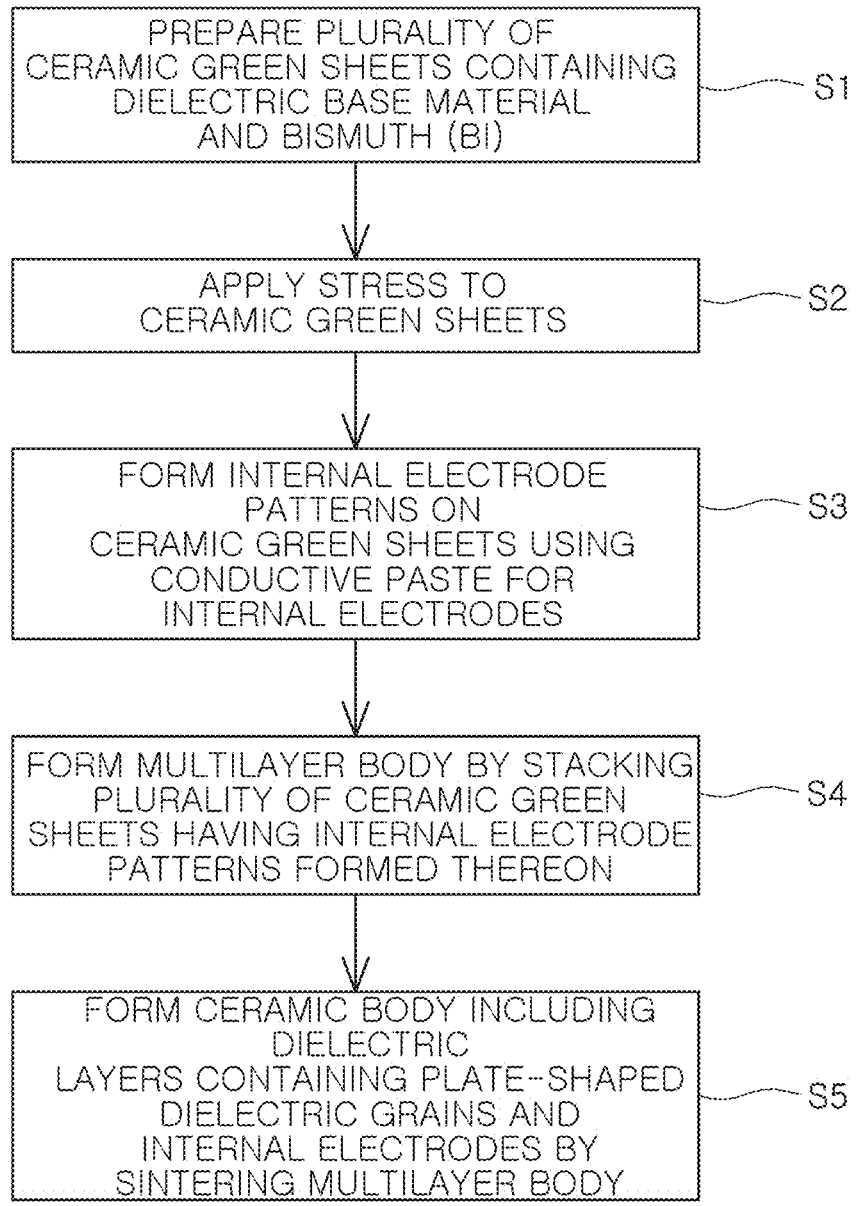
FIG. 5 is a flowchart illustrating a method of manufacturing a multilayer ceramic electronic component according to another exemplary embodiment of the present disclosure.

FIG. 5 is a flowchart illustrating a method of manufacturing a multilayer ceramic electronic component according to an exemplary embodiment of the present disclosure.

Referring to FIG. 5, the method of manufacturing the multilayer ceramic electronic component, the method may include: preparing a ceramic slurry containing a dielectric base material and bismuth (Bi) (S1); forming ceramic green sheets using the ceramic slurry (S2); forming internal electrode patterns on the ceramic green sheets using a conductive paste for internal electrodes (S3); forming a multilayer body by stacking the plurality of ceramic green sheets having the internal electrode patterns formed thereon (S4); and forming a ceramic body including dielectric layers containing plate-shaped dielectric grains and internal electrodes by sintering the multilayer body (S5).

In the method of manufacturing a multilayer ceramic capacitor according to the exemplary embodiment of the present disclosure, slurry containing a dielectric base material and bismuth may be prepared, and dielectric layers and cover layers may be formed using the prepared slurry.

The dielectric base material may be a barium titanate ($BaTiO_3$)-based dielectric material, but is not limited thereto.

The barium titanate-based dielectric material may include at least one of ferroelectric materials having a perovskite structure, for example, $BaTiO_3$, $(Ba_{1-x}Ca_x)(Ti_{1-y}Ca_y)O_3$, $(Ba_{1-x}Ca_x)(Ti_{1-y}Zr_y)O_3$, $(Ba_{1-x}Ca_x)TiO_3$, and the like.

The dielectric base material may be contained in the slurry as a powder formed of a plurality of particles. The bismuth may be contained in the slurry as a separate additive powder, or may be contained in the slurry by being coated on the dielectric base material or by being solidified in the dielectric base material.

According to an exemplary embodiment of the present disclosure, the slurry may further contain a solvent and a binder, and may further contain at least one of trimanganese tetraoxide ($Mn_3O_4$), vanadium oxide ($V_2O_5$), magnesium carbonate ($MgCO_3$), dysprosium oxide ($Dy_2O_3$), barium carbonate ($BaCO_3$), aluminum oxide ($Al_2O_3$), silicon dioxide ($SiO_2$), as additives, but the slurry is not limited thereto.

Then, ceramic green sheets having orientation in the dielectric base material may be prepared using the ceramic slurry.

A method of manufacturing the ceramic green sheets having orientation in the dielectric base material will be described below, but the present inventive concept is not limited thereto.

1) Method of Forming Orientation in Manufacturing Ceramic Green Sheets (Injection Molding)

In an injection molding process, the ceramic green sheets are manufactured using the ceramic slurry while forming orientation.

The method of forming the ceramic green sheets by using an injection device to perform an injection molding process using the prepared ceramic slurry may apply strong shearing stress to surfaces of the ceramic green sheets coming off of a discharge part.

The shearing stress may provide orientation to the dielectric base material contained in the ceramic green sheets, and the shearing stress applied to the ceramic green sheets and the addition of the bismuth may assist in forming highly oriented grains having a plate shape at the time of sintering the ceramic green sheets.

2) Method of Forming Orientation after Manufacturing Ceramic Green Sheets (Rolling)

In a rolling process, the prepared slurry is manufactured as sheets having a thickness of several μm by a doctor blade method, and the manufactured sheets are applied to carrier films and dried to thereby manufacture a plurality of ceramic green sheets, and then, shearing stress is applied to the ceramic green sheets.

For example, the manufactured ceramic green sheet is passed through two rotating rolls in the rolling process to apply the shearing stress to the ceramic green sheet, thereby forming orientation in the dielectric base material.

Similar to the injection molding process, the shearing stress applied to the ceramic green sheets and the addition of the bismuth may assist in forming highly oriented grains having a plate shape at the time of sintering the ceramic green sheets.

By applying the shearing stress to the ceramic green sheet containing the dielectric base material and bismuth as described above, the dielectric particles contained in the ceramic green sheet may be grown as the plate-shaped dielectric grains having uniform shapes and may have a high degree of orientation.

A high degree of orientation may indicate that a tendency in which the plate-shaped surfaces of the dielectric grains are arranged to be parallel to each other is high. In the case in which a degree of orientation is low, permittivity and high temperature withstand voltage properties may deteriorate.

According to an exemplary embodiment of the present disclosure, the slurry may contain 0.2 to 1.6 moles of the bismuth based on 100 moles of the dielectric base material, and in the case in which the bismuth is contained as bismuthoxide, the slurry may contain 0.1 to 0.8 mole of the bismuthoxide based on 100 moles of the dielectric base material.

Next, a conductive paste for internal electrodes containing a conductive powder may be prepared. The conductive powder may be a nickel powder.

After the conductive paste for internal electrodes is applied to the green sheets by a screen printing method to thereby form internal electrode patterns, a plurality of green sheets having the internal electrode patterns printed thereon may be stacked to form a multilayer body, and a plurality of green sheets having no internal electrode pattern may be stacked on upper and lower surfaces of the multilayer body. Then, a sintering process is performed to manufacture the ceramic body 110. The ceramic body may include the internal electrodes 121 and 122, the dielectric layers 111, and the cover layers, wherein the dielectric layers are formed by sintering the green sheets having the internal electrodes formed thereon, and the cover layers are formed by sintering the green sheets having no internal electrode.

The internal electrodes may include first and second internal electrodes.

Then, the first and second external electrodes 131 and 132 may be formed on an outer surface of the ceramic body to be electrically connected to the first and second internal electrodes, respectively. The first and second external electrodes may be formed by applying a paste containing a conductive metal and glass to the outer surface of the ceramic body and performing a sintering process, but are not limited thereto.

The conductive metal is not particularly limited, but may be, for example, at least one selected from a group consisting of copper (Cu), silver (Ag), nickel (Ni), and alloys thereof.

The glass is not specifically limited, but may be a material having the same composition as that of glass used in manufacturing external electrodes of a general multilayer ceramic capacitor.

Board Having Multilayer Ceramic Electronic Component Mounted Thereon

Figure 6:
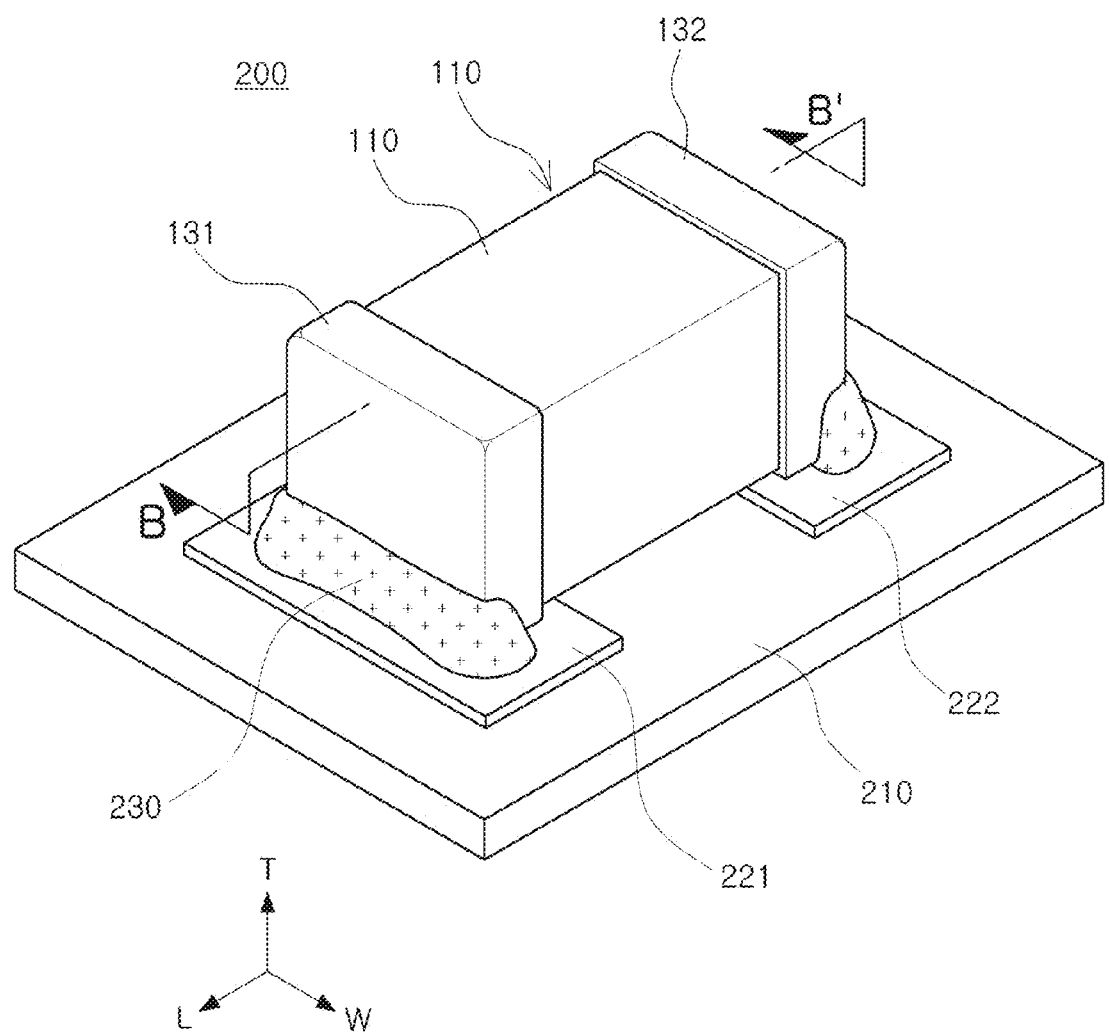
FIG. 6 is a perspective view illustrating a board having a multilayer ceramic electronic component mounted thereon according to another exemplary embodiment of the present disclosure.
Figure 7:
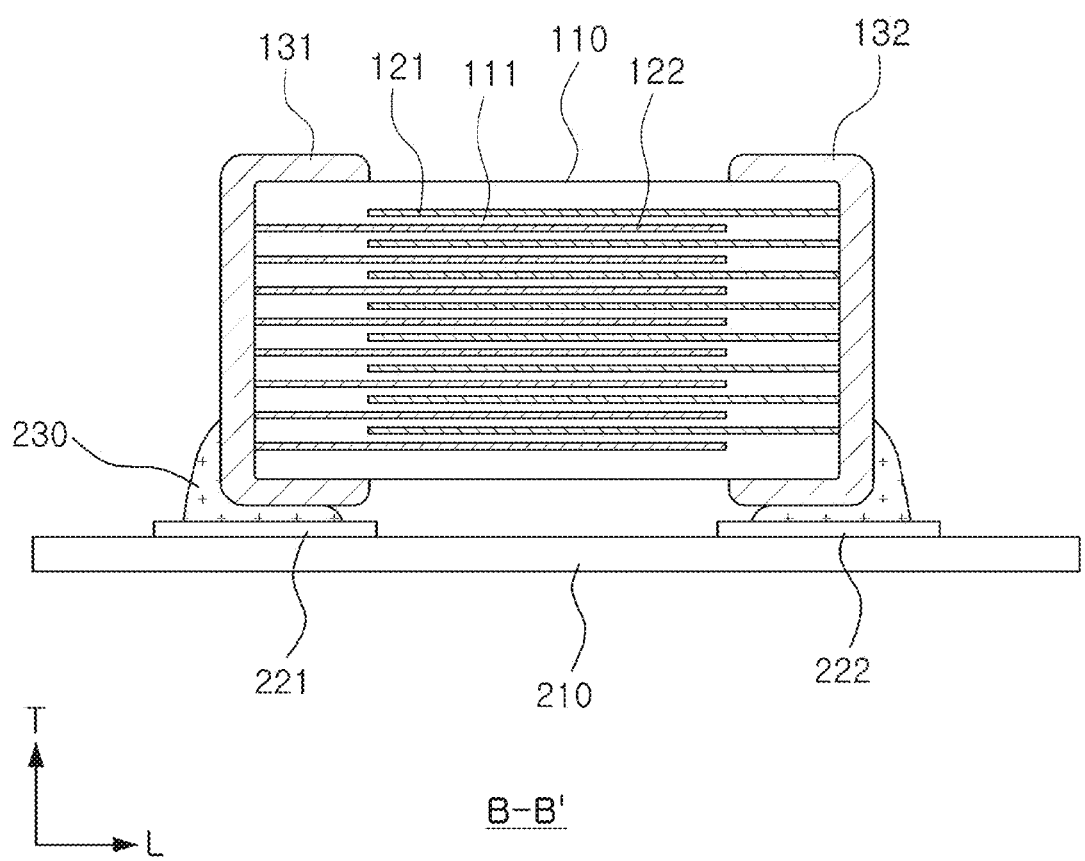
FIG. 7 is a cross-sectional view taken along line B-B' of FIG. 6.

FIG. 6 is a perspective view illustrating a board having a multilayer ceramic electronic component mounted thereon according to another embodiment of the present disclosure, and FIG. 7 is a cross-sectional view taken along line B-B' of FIG. 6.

Referring to FIGS. 6 and 7, a board 200 having a multilayer ceramic electronic component mounted thereon according to this exemplary embodiment of the present disclosure, the board may include: a printed circuit board 210 having first and second electrode pads 221 and 222 formed thereon; and a multilayer ceramic electronic component 100 mounted on the printed circuit board, wherein the multilayer ceramic electronic component includes: a ceramic body in which a plurality of dielectric layers containing plate-shaped dielectric grains are stacked; and a plurality of internal electrodes formed on the dielectric layers within the ceramic body, and an angle θ of a plate-shaped surface of the dielectric grain with regard to a boundary surface between the dielectric layer and the internal electrode is 20° or less.

The multilayer ceramic electronic component may include the first and second external electrodes 131 and 132, and the first and second external electrodes 131 and 132 may be mounted on the printed circuit board by a solder 230 to be connected to the first and second electrode pads 221 and 222, respectively.

A description of features the same as those of the multilayer ceramic electronic component 100 according to the previous exemplary embodiment will be omitted.

EXPERIMENTAL EXAMPLE

The following Table 1 represents data related to compositions of components contained in a dielectric layer of a multilayer ceramic electronic component according to Experimental Examples, and the following Table 2 represents data related to dielectric constants and high temperature withstand voltage properties of Samples 1 to 5 of Table 1.

Multilayer ceramic electronic components according to Experimental Examples were manufactured as follows.

First, slurry containing barium titanate ($BaTiO_3$) dielectric base powder and bismuth was applied to carrier films and dried to prepare a plurality of ceramic green sheets. Specific compositions of the slurry in Samples 1 to 5 are given in the following Table 1, and solvents and binders were further added to the compositions of Samples 1 to 5.

Then, the green sheets containing bismuth were rolled so that the dielectric grains whose plate-shaped surfaces have an angle θ of 20° or less with regard to the boundary surface between the dielectric layer and the internal electrode made up 60% or more of the dielectric grains contained in the dielectric layer, thereby forming orientation in the dielectric base material.

Next, a conductive paste for internal electrodes was applied to the green sheets by a screen printing method, thereby forming internal electrodes. After 250 layers of the internal electrodes were stacked to manufacture a multilayer body, the multilayer body was compressed and cut to form a chip having a 0603 size, and the chip was sintered under a reducing atmosphere in which $H_2$ was 0.1% or less.

Then, a paste for external electrodes was applied to end surfaces of the ceramic body and then sintered to form external electrodes. Thereafter, dielectric constants and high temperature withstand voltage properties were measured, and results thereof are given in the following Table 2.

Regarding the dielectric constants, a room temperature capacitance was measured under conditions of 1 kHz and AC 0.5V/μm using an LCR meter, and regarding the high temperature withstand voltage properties, resistance degradation behavior was measured by increasing a voltage level by 5V/μm for each step at 150. At the time of measuring the high temperature withstand voltage level, 10 minutes were required for each step and resistance values were measured every five seconds. The high temperature withstand voltage levels of Tables 2 and 3 indicate a voltage level withstanding IR of $10^5 \Omega$ or more.

The compositions of the following Table 1 indicate a relative molar ratio of each component based on 100 moles of the barium titanate base material.

TABLE 1

| Sample | $Mn_3O_4$ | $V_2O_5$ | $MgCO_3$ | $Dy_2O_3$ | $BaCO_3$ | $Al_2O_3$ | $SiO_2$ | $Bi_2O_3$ |
|--------|-----------|----------|----------|-----------|----------|-----------|---------|-----------|
| 1 | 0.10 | 0.10 | 1.00 | 0.4 | 1.20 | 0.20 | 1.25 | 0.00 |
| 2 | 0.10 | 0.10 | 1.00 | 0.4 | 1.20 | 0.20 | 1.25 | 0.05 |
| 3 | 0.10 | 0.10 | 1.00 | 0.4 | 1.20 | 0.20 | 1.25 | 0.08 |
| 4 | 0.10 | 0.10 | 1.00 | 0.4 | 1.20 | 0.20 | 1.25 | 0.1 |
| 5 | 0.10 | 0.10 | 1.00 | 0.4 | 1.20 | 0.20 | 1.25 | 0.2 |
| 6 | 0.10 | 0.10 | 1.00 | 0.4 | 1.20 | 0.20 | 1.25 | 0.5 |
| 7 | 0.10 | 0.10 | 1.00 | 0.4 | 1.20 | 0.20 | 1.25 | 0.8 |
| 8 | 0.10 | 0.10 | 1.00 | 0.4 | 1.20 | 0.20 | 1.25 | 0.9 |
| 9 | 0.10 | 0.10 | 1.00 | 0.4 | 1.20 | 0.20 | 1.25 | 1.0 |
| 10 | 0.10 | 0.10 | 1.00 | 0.4 | 1.20 | 0.20 | 1.25 | 1.2 |

TABLE 2

| Sample | Dielectric Constant (F/m) | High Temperature Withstand Voltage (V/mm) |
|---|---|---|
| 1 | 3005 | 30 |
| 2 | 3400 | 30 |
| 3 | 3577 | 35 |
| 4 | 3876 | 55 |
| 5 | 3903 | 60 |
| 6 | 3876 | 55 |
| 7 | 3954 | 65 |
| 8 | 4008 | 35 |
| 9 | 4057 | 30 |
| 10 | 4112 | 25 |

It can be seen from Tables 1 and 2 that samples 1 to 3, containing less than 0.1 mole of bismuthoxide based on 100 moles of the barium titanate base material, had low dielectric constants and high temperature withstand voltage values. It can be seen that samples 4 to 7, containing 0.1 to 0.8 mole of bismuthoxide based on 100 moles of the barium titanate base material, had high dielectric constants and high temperature withstand voltage values. It can be seen that samples 8 to 10, containing more than 0.8 mole of bismuthoxide based on 100 moles of the barium titanate base material, had an increase in dielectric constants but a decreased in high temperature withstand voltage values.

Therefore, it may be seen that bismuthoxide may be contained in an amount of 0.1 to 0.8 mole based on 100 moles of the barium titanate base material, and bismuth may be contained in an amount of 0.2 to 1.6 moles based on 100 moles of the dielectric base material, in consideration of converting bismuthoxide into bismuth.

In addition, FIGS. 8A through 8E are scanning electron microscope (SEM) photographs of dielectric grains prepared according to the compositions of samples 1, 2, 3, 6, and 9 of Table 1.

Figure 8A:
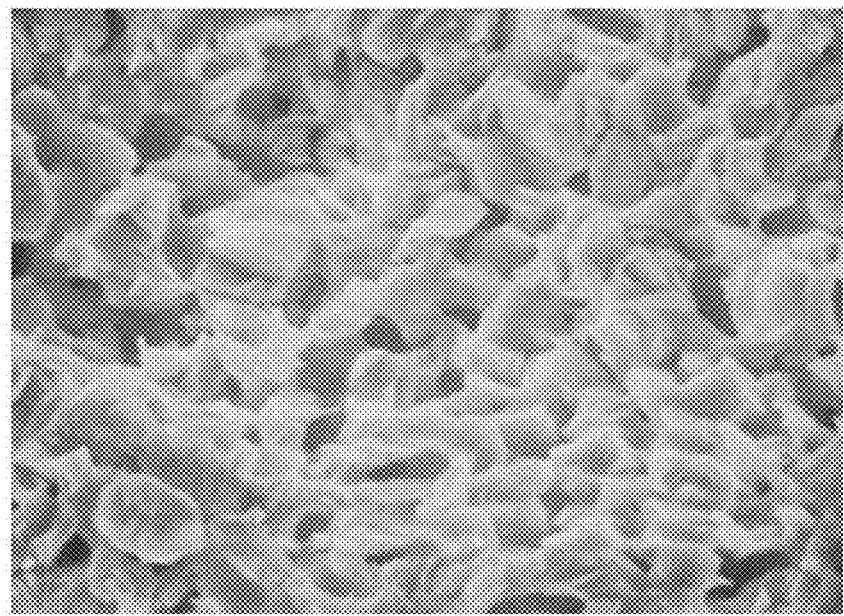
FIGS. 8A through 8E are scanning electron microscope (SEM) photographs illustrating dielectric grains contained in a dielectric layer of a multilayer ceramic electronic component manufactured according to Experimental Example of the present disclosure.
Figure 8B:
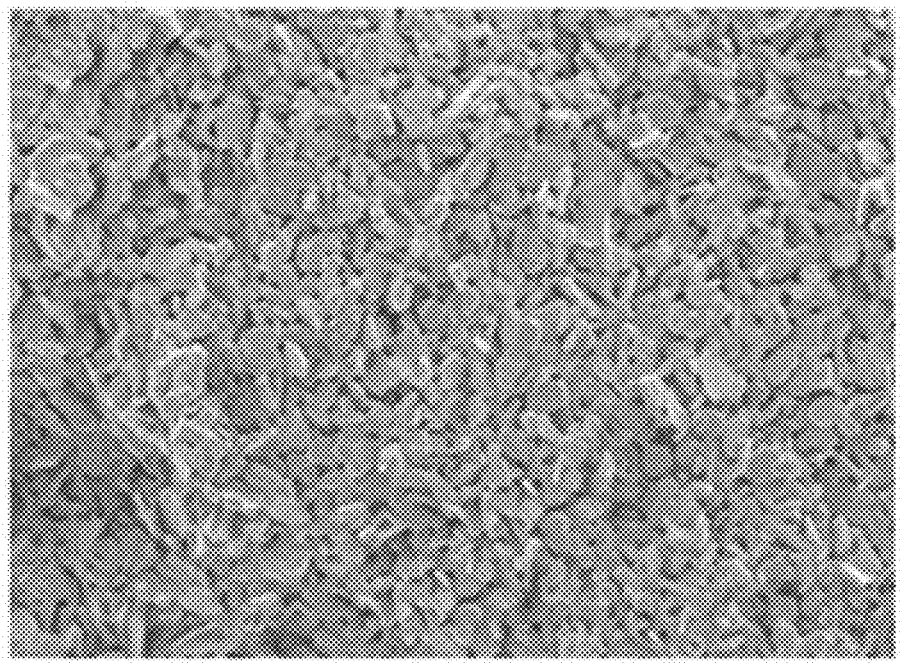
Figure 8C:
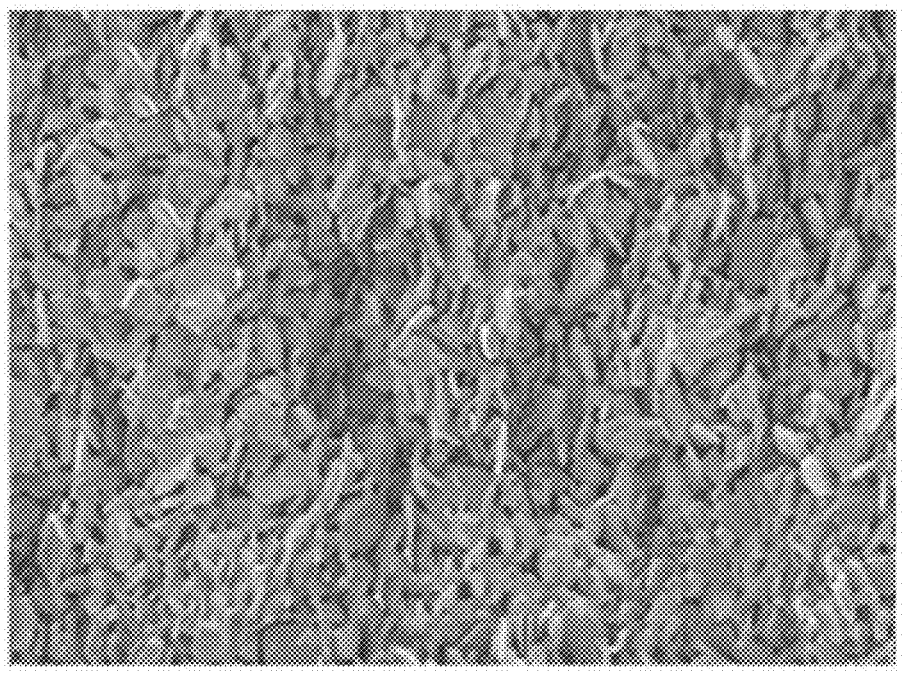

FIG. 8A is a photograph of dielectric grains of sample 1 in which bismuthoxide is not contained, illustrating that the dielectric grains do not have a plate shape but have a non-uniform shape. FIGS. 8B and 8C are photographs of dielectric grains prepared according to the compositions of samples 2 and 3, respectively, illustrating that the plate-shaped grains are formed due to the addition of the bismuth, but a ratio of a diameter of the plate-shaped surface of the dielectric grain to a thickness of the dielectric grain is not high and a degree of orientation is not uniform.

Figure 8D:
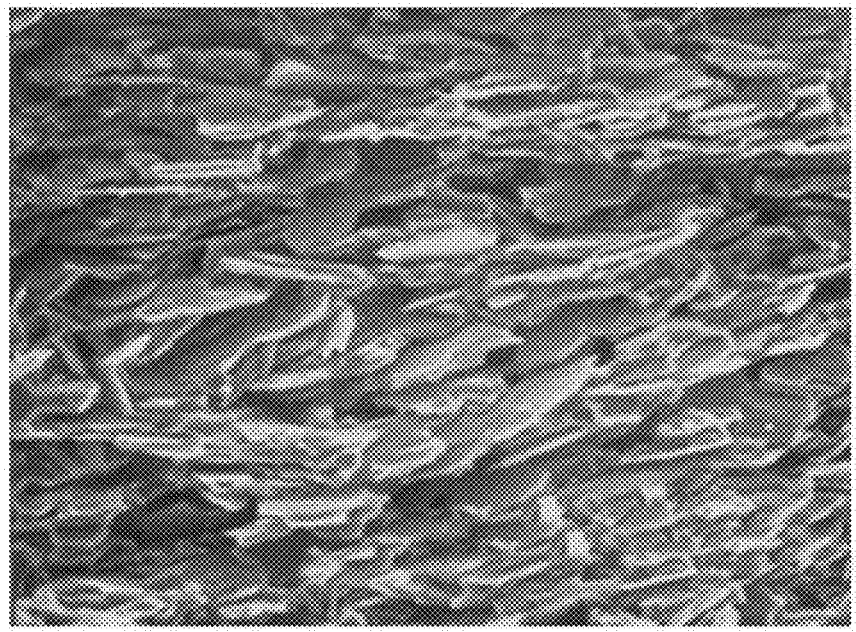

FIG. 8D is a photograph of dielectric grains prepared according to the composition of sample 6, illustrating that the dielectric grains are formed to have a plate shape while a ratio of the plate-shaped surface of the dielectric grain to the thickness of the dielectric grain is high and a degree of orientation is high.

Figure 8E:
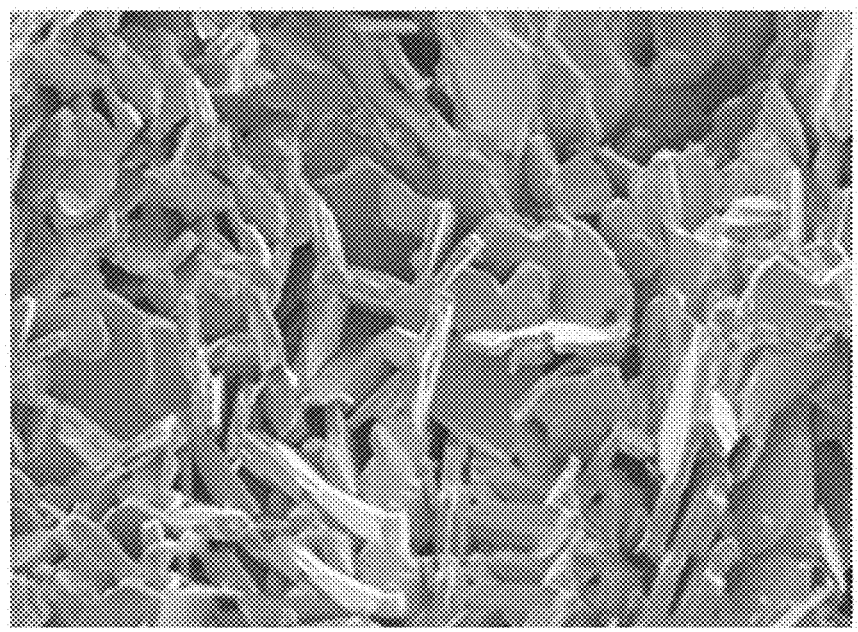

FIG. 8E is a photograph of dielectric grains prepared according to the composition of sample 9, illustrating that the dielectric grains are formed to have a plate shape, but a size of the dielectric grain is increased, and thus, dielectric constant may be increased, but reliability may deteriorate.

The following Table 3 represents data related to dielectric constant and high temperature withstand voltage properties according to orientation of dielectric grains contained in dielectric layers of multilayer ceramic electronic components according to Experimental Examples (the orientation of the dielectric grains being represented by a fraction of dielectric grains whose plate-shaped surfaces have an angle θ of 20° or less with regard to the boundary surface between the dielectric layer and the internal electrode). The orientation of the dielectric grains was adjusted by shearing stress applied to the green sheet in a rolling process, and the composition of the ceramic slurry forming the dielectric layer was the same as that of sample 7 of Table 1. In Table 3, dielectric constants and high temperature withstand voltage values were measured by calculating an average value of dielectric constants and high temperature withstand voltage values of a plurality of multilayer ceramic electronic components containing dielectric grains oriented to satisfy a range of each sample. The dielectric constant and high temperature withstand voltage properties were evaluated in the same manner as illustrated in Tables 1 and 2.

TABLE 3

| Sample | Fraction of Dielectric Grains Oriented (20° or Less) | Dielectric Constant (F/m) | High Temperature Withstand Voltage (V/mm) |
|---|---|---|---|
| 11 | 90% or More | 3915 | 70 |
| 12 | 80% to 90% | 3900 | 60 |
| 13 | 70% to 80% | 3853 | 65 |
| 14 | 60% to 70% | 3827 | 60 |
| 15 | 50% to 60% | 3301 | 45 |

It may be seen from Table 3 that in the case in which the dielectric grains whose plate-shaped surfaces have an angle θ of 20° or less with regard to the boundary surface between the dielectric layer and the internal electrode are contained in an amount less than 60%, the dielectric constant may be decreased and the high temperature withstand voltage properties may also deteriorate.

As set forth above, according to exemplary embodiments of the present disclosure, a multilayer ceramic electronic component having high capacitance and high reliability, a manufacturing method thereof, and a board having the same mounted thereon may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component, comprising:
   a ceramic body in which dielectric layers containing plate-shaped dielectric grains are stacked; and
   internal electrodes disposed on the dielectric layers within the ceramic body,
   wherein the dielectric layer contains dielectric grains, plate-shaped surfaces of which have an angle of 20° or less with regard to a boundary surface between the dielectric layer and the internal electrode.

2. The multilayer ceramic electronic component of claim 1, wherein when a diameter of the plate-shaped surface of the dielectric grain is a and a thickness of the dielectric grain is c, a/c≥1.5 is satisfied.

3. The multilayer ceramic electronic component of claim 1, wherein when an area of the plate-shaped surface of the dielectric grain is s and a thickness of the dielectric grain is c, s/c≥2.25 is satisfied.

4. The multilayer ceramic electronic component of claim 1, wherein the dielectric layer comprises a dielectric base material and bismuth.

5. The multilayer ceramic electronic component of claim 1, wherein the dielectric layer comprises a dielectric base material, and
   the dielectric base material comprises a barium titanate-based dielectric material.

6. The multilayer ceramic electronic component of claim 1, wherein the dielectric layer comprises a dielectric base material and bismuth, and the bismuth is contained in an amount of 0.2 to 1.6 moles based on 100 moles of the dielectric base material.

7. The multilayer ceramic electronic component of claim 1, wherein the dielectric layer comprises a dielectric base material and bismuth, and the bismuth is contained as bismuthoxide ($Bi_2O_3$) in an amount of 0.1 to 0.8 mole based on 100 moles of the dielectric base material.

8. The multilayer ceramic electronic component of claim 1, wherein the dielectric grains, plate-shaped surfaces of which have an angle of 20° or less with regard to the boundary surface between the dielectric layer and the internal electrode, make up 60% or more of the dielectric grains contained in the dielectric layer.

* * * * *